United States Patent
Cheung et al.

(10) Patent No.: US 11,456,983 B2
(45) Date of Patent: Sep. 27, 2022

(54) INTERACTIVE OPERATION METHOD, AND TRANSMITTER MACHINE, RECEIVER MACHINE AND INTERACTIVE OPERATION SYSTEM USING THE SAME

(71) Applicant: ABLE WORLD INTERNATIONAL LIMITED, Tortola (VG)

(72) Inventors: Wai-Tung Cheung, Hong Kong (HK); Chun-Hsiao Lin, New Taipei (TW); Ho-Cheung Cheung, Hong Kong (HK)

(73) Assignee: Able World International Limited, Tortola (VG)

( * ) Notice: Subject to any disclaimer, the term of this patent is extended or adjusted under 35 U.S.C. 154(b) by 452 days.

(21) Appl. No.: 15/546,447

(22) PCT Filed: Jan. 29, 2016

(86) PCT No.: PCT/CN2016/072761
§ 371 (c)(1),
(2) Date: Jul. 26, 2017

(87) PCT Pub. No.: WO2016/119744
PCT Pub. Date: Aug. 4, 2016

(65) Prior Publication Data
US 2018/0019963 A1 Jan. 18, 2018

Related U.S. Application Data

(60) Provisional application No. 62/109,324, filed on Jan. 29, 2015.

(51) Int. Cl.
*G06F 15/16* (2006.01)
*H04L 51/18* (2022.01)
(Continued)

(52) U.S. Cl.
CPC ............ *H04L 51/18* (2013.01); *G06Q 10/101* (2013.01); *H04L 51/04* (2013.01); *H04L 51/10* (2013.01); *H04L 51/52* (2022.05)

(58) Field of Classification Search
CPC ......... H04L 51/18; H04L 51/04; H04L 51/10; H04L 51/32
(Continued)

(56) References Cited

U.S. PATENT DOCUMENTS 7,610,287 B1 * 10/2009 Dean .................... H04L 12/1818
8,745,537 B1 * 6/2014 Shakeri ..................... G06F 8/34
715/853

(Continued)

OTHER PUBLICATIONS

Huang, "Web-based support for collaborative product design review", Elsevier, p. 71-88, Computers in Industry vol. 48, Issue 1, May 2002 (Year: 2002).*

(Continued)

*Primary Examiner* — Taylor A Elfervig
(74) *Attorney, Agent, or Firm* — Hamilton, Brook, Smith & Reynolds, P.C.

(57) ABSTRACT

An interactive operation method is provided. Firstly, an interactive operation request is delivered or received. Then, a first user and a second user perform an interactive operation according to the interactive operation request. The interactive operation request contains a uniform resource identifier with an instruction code. A projectable space instance for modeling a workspace is acquired through the uniform resource identifier. A projected workspace corresponding to the workspace is built after the projectable space instance is parsed. When the instruction code is executed in the projected workspace, the interactive operation is performed.

14 Claims, 13 Drawing Sheets

(51) Int. Cl.
  *G06Q 10/10* (2012.01)
  *H04L 51/52* (2022.01)
  *H04L 51/04* (2022.01)
  *H04L 51/10* (2022.01)

(58) Field of Classification Search
  USPC .......................................................... 709/206
  See application file for complete search history.

(56) References Cited

U.S. PATENT DOCUMENTS

| | | | | | |
|---|---|---|---|---|---|
| 8,972,507 | B1 * | 3/2015 | Hendren | ................. | G06F 16/24 |
| | | | | | 709/206 |
| 9,134,963 | B1 * | 9/2015 | Lai | ............................ | G06F 8/35 |
| 2001/0039570 | A1 * | 11/2001 | Stewart | .................. | H04L 51/00 |
| | | | | | 709/205 |
| 2002/0075290 | A1 * | 6/2002 | Rajarajan | ................ | G06T 11/60 |
| | | | | | 715/700 |
| 2002/0161896 | A1 * | 10/2002 | Wen | .................... | H04L 12/1827 |
| | | | | | 709/227 |
| 2004/0034848 | A1 * | 2/2004 | Moore | ................... | G06N 5/047 |
| | | | | | 717/110 |
| 2006/0088152 | A1 * | 4/2006 | Green | .................... | H04M 3/56 |
| | | | | | 379/202.01 |
| 2008/0163164 | A1 * | 7/2008 | Chowdhary | ............. | G06F 8/35 |
| | | | | | 717/106 |
| 2009/0254877 | A1 * | 10/2009 | Kuriakose | ................. | G06F 8/35 |
| | | | | | 707/999.1 |
| 2010/0030901 | A1 * | 2/2010 | Hallberg | ............ | H04N 21/4438 |
| | | | | | 709/228 |
| 2011/0219078 | A1 * | 9/2011 | Beresford-Wood | .... | G06F 15/16 |
| | | | | | 709/205 |
| 2012/0151373 | A1 * | 6/2012 | Kominac | ........... | H04L 67/2823 |
| | | | | | 715/740 |
| 2014/0173744 | A1 * | 6/2014 | Borohovski | .......... | G06F 21/577 |
| | | | | | 726/25 |
| 2014/0280370 | A1 * | 9/2014 | Oberle | ................. | G06F 16/289 |
| | | | | | 707/803 |
| 2014/0289646 | A1 * | 9/2014 | Munir | ................. | H04L 65/1093 |
| | | | | | 715/753 |
| 2015/0135170 | A1 * | 5/2015 | Murray | .............. | G06F 9/44536 |
| | | | | | 717/148 |
| 2015/0339745 | A1 * | 11/2015 | Peter | ................... | G06F 16/9558 |
| | | | | | 705/26.42 |
| 2016/0179351 | A1 * | 6/2016 | Arnoldin | .............. | G06F 3/0488 |
| | | | | | 715/759 |

OTHER PUBLICATIONS

Yang, "Research and development of web-based virtual online classroom", Elsevier, Computers & Education vol. 48, Issue 2, Feb. 2007, pp. 171-184 (Year: 2007).*

Shcmid, "Potential pedagogical benefits and drawbacks of multimedia use in the English language classroom equipped with interactive whiteboard technology", Elsevier, Computers & Education vol. 51, Issue 4, Dec. 2008, pp. 1553-1568 (Year: 2008).*

Whittaker, S., Tucker, S., & Lalanne, D. (2012). Meeting browsers and meeting assistants. In S. Renals, H. Bourlard, J. Carletta, & A. Popescu-Belis (Eds.), Multimodal Signal Processing: Human Interactions in Meetings (pp. 204-217). Cambridge: Cambridge University Press., 2012 (Year: 2012).*

Ng S. T. Chong and Masao Sakauchi. 2001. Creating and sharing Web notes via a standard browser. SIGCUE Outlook 27, 3 (Sep. 2001), 4-15 (Year: 2001).*

L. Anido-Rifon, M. J. Fernández-Iglesias, M. Llamas-Nistal, M. Caeiro-Rodríguez, J. Santos-Gago, and J. S. Rodríguez-Estévez. 2001. A component model for standardized web-based education. J. Educ. Resour. Comput. 1, 2es (Summer 2001) (Year: 2001).*

Prawee Sriplakich, Xavier Blanc, and Marie-Pierre Gervals. 2008. Collaborative software engineering on large-scale models: requirements and experience in ModelBus. In Proceedings of the 2008 ACM symposium on Applied computing (SAC '08). Association for Computing Machinery, New York, NY, USA, 674-681 (Year: 2008).*

Philip J. Guo. 2013. Online python tutor: embeddable web-based program visualization fores education. In Proceeding of the 44th ACM technical symposium on Computer science education (SIGCSE '13). Association for Computing Machinery, New York, NY, USA, 579-584. (Year: 2013).*

Nilufar Baghaei et al, "Supporting collaborative learning and problem-solving in a constraint-based CSCL environment for UML class diagrams", Sep. 2007International Journal of Computer-Supported Collaborative Learning 2(2-3):159-190 (Year: 2007).*

Du Li and U. Chandra, "Building Web-based collaboration services on mobile phones," 2008 International Symposium on Collaborative Technologies and Systems, 2008, pp. 295-304, (Year: 2008).*

Curran, K. An Online Collaboration Environment. Education and Information Technologies 7, 41-53 (2002) (Year: 2002).*

H. C. Hong and Y. C. Chen, "Design and implementation of a Web-based Real-time Interactive Collaboration Environment," The Ninth IEEE Workshop on Future Trends of Distributed Computing Systems, 2003. FTDCS 2003. Proceedings., 2003, pp. 295-300 (Year: 2003).*

D. Xu, J. Kurogi, Y. Ohgame and A. Hazeyama, "Distributed Collaborative Modeling Support System Associating UML Diagrams with Chat Messages," 2009 33rd Annual IEEE International Computer Software and Applications Conference, 2009, pp. 367-372 (Year: 2009).*

Skylar, Ashley. (2009). A Comparison of Asynchronous Online Text-Based Lectures and Synchronous Interactive Web Conferencing Lectures. Issues in Teacher Education. Fall. , p. 69-84 (Year: 2009).*

Ang, Hongji & Boldyreff, Cornelia & Nutter, David & Rank, Stephen & Kyaw, Phyo & Lavery, Janet. (2005). Support for Collaborative Component-Based Software Engineering, p. 77-91 (Year: 2005).*

Pimentel, Maria & Ishiguro, Yoshihide & Kerimbaev, Bolot & Abowd, Gregory & Guzdial, Mark. (2001). Supporting Long-term Educational Activities Through Dynamic Web Interfaces. Interacting with Computers. 13. 353-374 (Year: 2001).*

L. Gericke, R. Gumienny and C. Meinel, "Message capturing as a paradigm for asynchronous digital whiteboard interaction," 6th International Conference on Collaborative Computing: Networking, Applications and Worksharing (CollaborateCom 2010), 2010, pp. 1-10 (Year: 2010).*

Shaobo Deng, "Remote online interactive teaching system design and implementation," 2012 International Conference on Computer Science and Information Processing (CSIP), 2012, pp. 680-683 (Year: 2012).*

B. Johanson and A. Fox, "The Event Heap: a coordination infrastructure for interactive workspaces," Proceedings Fourth IEEE Workshop on Mobile Computing Systems and Applications, 2002, pp. 83-93 (Year: 2002).*

Nilufar, "A Collaborative Constraint-Based Intelligent System for Learning Objectoriented Analysis and Design Using UML", University of Canterbury. Computer Science and Software Engineering, 2007, p. 1-234 (Year: 2007).*

M. Wenzel, L. Gericke, R. Gumienny and C. Meinel, "Towards cross-platform collaboration—Transferring real-time groupware to the browser," Proceedings of the 2013 IEEE 17th International Conference on Computer Supported Cooperative Work in Design (CSCWD), 2013, pp. 49-54 (Year: 2013).*

N. Buasri, T. Janpan, U. Yamborisutand D. Wongsawang, "Web-based interactive virtual classroom using HTML5-based technology," 2014 Third ICT International Student Project Conference (ICT-ISPC), 2014, pp. 33-36 (Year: 2014).*

* cited by examiner

INTERACTIVE OPERATION METHOD, AND TRANSMITTER MACHINE, RECEIVER MACHINE AND INTERACTIVE OPERATION SYSTEM USING THE SAME

CROSS-REFERENCE TO RELATED APPLICATION

This application claims the benefit as a national stage of the PCT application PCT/CN2016/072761 with an international filing date of Jan. 29, 2016, which claims benefit to U.S. Provisional Patent Application No. 62/109,324, filed Jan. 29, 2015, entitled "Method of performing an interactive operation", the contents of which are incorporated herein by reference.

TECHNICAL FIELD

The present invention relates to an interactive operation method and a transmitter machine, a receiver machine and an interactive operation system using the interactive operation method, and more particularly to an interactive operation method through internet connection and a transmitter machine, a receiver machine and an interactive operation system using the interactive operation method.

BACKGROUND

In today's convenience daily life, people are accustomed to using an electronic device with computational capability to achieve various applications. For example, these applications include working, file processing, entertainment, social communication, and so on. With development of science and technology, information can be propagated more quickly. Accordingly, various web platforms, operating systems and software tools have been have been developed for people to use, and brought more efficient lives to the users. Especially in the post-PC era, the conventional desktop computers, tablet computers, mobile phones or other mobile devices still make people to implement tasks whenever and wherever they are, and people over the world communicate with each other to implement various interactive operations through the internet. For example, the interactive operations include text messaging, voice conversation, video conversation, multiplayer games or associated entertainments.

For allowing people to perform interactive operations through the internet, lots of application programs such as LINE, WhatsAPP, WeChat and other instant messaging (IM) application programs have been developed. Generally, when the IM application program is executed, the function of bi-directionally delivering text messages between two parties can be achieved. Moreover, some IM application programs use a push technology to provide real-time text messages. Especially, some IM application programs allow users to transfer files or allow users to implement voice conversation or video conversation through the internet according to a VOIP (Voice over IP) technology.

However, there are some limitations on the usage of the IM application programs. For example, LINE is an IM application program that allows the users to exchange text messages, graphics, video media files or audio media files, make VoIP calls, and hold video conversations on smart phones or personal computers. However, before the LINE functions are used, it is necessary for the users to download the LINE application program and register accounts with their phone numbers or email addresses for the purpose of sharing information under the LINE service provider. Moreover, it is impossible for the LINE users to communicate with other users which do not install the LINE application program. Moreover, in addition to the functions of text messaging, voice conversation, video conversation and file transfer, users cannot perform any other interactive operation because the IM application program and the IM service providers do not provide the associate interactive operation service.

For providing other environments for instant messaging, a browser-based real-time communication technology known as WebRTC (Web Real-Time Communication) has been disclosed. WebRTC is an application programming interface (API) that supports browser-to-browser applications for instant messaging, audio conversation and video conversation. A Firefox browser developed by Mozilla Foundation gets WebRTC features known as Firefox Hello. The users of Firefox Hello can have free audio or video conversations through Firefox browsers to communicate with friends using the WebRTC-supported browsers like Firefox, Chrome, or Opera without downloading any application program or registering any account. The working procedure of Firefox Hello will be illustrated as follows.

When a first user wants to perform the instant messaging operation, the first user launches Firefox browser and clicks the Hello button on the toolbar to generate a link. Then, the first user sends the link to a second user. After the second user receives the link and opens the link with a WebRTC-supported browser, a start button will be shown on the browser of the second user. After the second user clicks the start button, a pop-up notification window is shown on the Firefox browser of the first user. If the first user clicks the answer button to accept the conversation, the first user and the second user can start to make audio conversation or video conversation. The Firefox Hello functions of the Firefox browser are well known to those skilled in the art, and are not redundantly described herein.

However, the Firefox Hello functions of the Firefox browser still have some drawbacks. Firstly, the first user can only use the Firefox browser to generate the link for performing the instant messaging operation. Moreover, if the first user re-launches the Firefox browser, the link is invalid. Secondly, after the second user opens the link and clicks the start button on the browser, the second user needs to wait until the first user clicks the answer button to start the conversation. Thirdly, the link provided by the first user through the Firefox browser only allows the first user and the second user to make audio or video conversation. Moreover, the first user and the second user cannot perform other interactive operations or cooperative tasks through the browser.

From the above discussions, it is important for users to communicate with each other and perform interactive operations with each other in a self-defined environment without the need of downloading any application program or registering any account.

SUMMARY

The present invention provides an interactive operation method for allowing users to communicate with each other and perform interactive operations with each other in a self-defined workspace without the need of downloading any application program or registering any account. Moreover, the present invention also provides a transmitter machine, a receiver machine and an interactive operation system using the interactive operation method.

In accordance with an aspect of the present invention, there is provided an interactive operation method. Firstly, an interactive operation request is provided. The interactive operation request contains a uniform resource identifier with an instruction code. Then, plural users perform an interactive operation through a projected workspace corresponding to a workspace according to the instruction code.

In an embodiment, a projectable space instance for modeling the workspace is acquired through the uniform resource identifier.

In an embodiment, the projected workspace is built after the projectable space instance is parsed by a projector; and/or at least one unified matter is allowed to be added to or removed from the projectable space instance; and/or the projectable space instance is an object, an extensible markup language document, or an instance which is instantiated with a structured language or a structured protocol.

In an embodiment, the interactive operation request is delivered from a transmitter machine of a first user of the plural users and received by a receiver machine of at least one second user of the plural users. The instruction code contains at least one information about the first user and/or the transmitter machine.

In an embodiment, the interactive operation includes an audio conversation or a video conversation, and the at least one information contains at least one of a channel ID, a caller port and a caller ID.

In an embodiment, when the instruction code is executed, at least one unified tool of the projected workspace performs the interactive operation.

In accordance with another aspect of the present invention, there is provided an interactive operation method. Firstly, an interactive operation request is delivered or received. Then, a first user and a second user perform an interactive operation according to the interactive operation request. The interactive operation request contains a uniform resource identifier with an instruction code. A projectable space instance for modeling a workspace is acquired through the uniform resource identifier. A projected workspace corresponding to the workspace is built after the projectable space instance is parsed. When the instruction code is executed in the projected workspace, a task corresponding to the interactive operation is performed.

In an embodiment, the interactive operation method further includes a step of building a workspace and configuring the workspace before the interactive operation request is performed.

In an embodiment, the interactive operation request is delivered from a transmitter machine of the first user and received by a receiver machine of the second user. The instruction code contains at least one information about the first user and/or the transmitter machine.

In an embodiment, the interactive operation includes an audio conversation or a video conversation, and the at least one information contains at least one of a channel ID, a caller port and a caller ID.

In an embodiment, when the instruction code is executed, at least one unified tool of the projected workspace performs the task.

In an embodiment, the projected workspace is built after the projectable space instance is parsed; and/or at least one unified matter is allowed to be added to or removed from the projectable space instance; and/or the projectable space instance is an object, an extensible markup language document, or an instance which is instantiated with a structured language or a structured protocol.

In accordance with another aspect of the present invention, there is provided an interactive operation method. Firstly, a projectable space instance for modeling a workspace is provided to a receiver machine when an interactive operation request is received by the receiver machine. Then, a projected workspace corresponding to a workspace is built according to the projectable space instance. The interactive operation request contains a uniform resource identifier with an instruction code. Then, plural users perform an interactive operation through the projected workspace according to the instruction code.

In an embodiment, the interactive operation request is delivered from a transmitter machine of a first user of the plural users and received by the receiver machine of at least one second user of the plural users. The instruction code contains at least one information about the first user and/or the transmitter machine.

In an embodiment, the interactive operation includes an audio conversation or a video conversation, and the at least one information contains at least one of a channel ID, a caller port and a caller ID.

In an embodiment, when the instruction code is executed, at least one unified tool of the projected workspace performs a task corresponding to the interactive operation.

In an embodiment, the projected workspace is built after the projectable space instance is parsed; and/or at least one unified matter is allowed to be added to or removed from the projectable space instance; and/or the projectable space instance is an object, an extensible markup language document, or an instance which is instantiated with a structured language or a structured protocol.

In accordance with another aspect of the present invention, there is provided an interactive operation system. The interactive operation system includes a projectable space instance a receiver machine. The projectable space instance is used for modeling a workspace. When an interactive operation request is received by the receiver machine, the projectable space instance is provided to a receiver machine, so that a projected workspace corresponding to the workspace is built. The interactive operation request contains a uniform resource identifier with an instruction code. Moreover, plural users perform an interactive operation through the projected workspace according to the instruction code.

In an embodiment, the interactive operation request is delivered from a transmitter machine of a first user of the plural users and received by the receiver machine of at least one second user of the plural users, wherein the instruction code contains at least one information about the first user and/or the transmitter machine.

In an embodiment, the interactive operation includes an audio conversation or a video conversation, and the at least one information contains at least one of a channel ID, a caller port and a caller ID.

In an embodiment, when the instruction code is executed, at least one unified tool of the projected workspace performs a task corresponding to the interactive operation.

In an embodiment, the projected workspace is built after the projectable space instance is parsed; and/or at least one unified matter is allowed to be added to or removed from the projectable space instance; and/or the projectable space instance is an object, an extensible markup language document, or an instance which is instantiated with a structured language or a structured protocol.

In accordance with another aspect of the present invention, there is provided a transmitter machine for delivering an interactive operation request to a receiver machine. A first user operating the transmitter machine and a second user operating the receiver machine perform an interactive operation according to the interactive operation request. The interactive operation request contains a uniform resource identifier with an instruction code. A projectable space instance for modeling a workspace is acquired through the uniform resource identifier. A projected workspace corresponding to the workspace is built after the projectable space instance is parsed. When the instruction code is executed in the projected workspace, a task corresponding to the interactive operation is performed.

In an embodiment, the instruction code contains at least one information about the first user and/or the transmitter machine.

In an embodiment, the interactive operation includes an audio conversation or a video conversation, and the at least one information contains at least one of a channel ID, a caller port and a caller ID.

In an embodiment, when the instruction code is executed, at least one unified tool of the projected workspace performs the task.

In an embodiment, the projected workspace is built after the projectable space instance is parsed; and/or at least one unified matter is allowed to be added to or removed from the projectable space instance; and/or the projectable space instance is an object, an extensible markup language document, or an instance which is instantiated with a structured language or a structured protocol.

In accordance with another aspect of the present invention, there is provided a receiver machine for loading a projector and receiving an interactive operation request. After the interactive operation request is received, a projectable space instance for modeling a workspace is acquired by the receiver machine. After the projectable space instance is parsed by the projector, a projected workspace corresponding to the workspace is built in the receiver machine, so that plural users are allowed to perform an interactive operation. The interactive operation request contains a uniform resource identifier with an instruction code. A task corresponding to the interactive operation is performed through the projected workspace according to the instruction code.

In an embodiment, when the instruction code is executed, at least one unified tool of the projected workspace performs the task.

In an embodiment, at least one unified matter is allowed to be added to or removed from the projectable space instance; and/or the projectable space instance is an object, an extensible markup language document, or an instance which is instantiated with a structured language or a structured protocol.

The above objects and advantages of the present invention will become more readily apparent to those ordinarily skilled in the art after reviewing the following detailed description and accompanying drawings, in which:

DETAILED DESCRIPTION

The present invention is more fully appreciated by reference to the following description, including the following glossary of terms and the concluding examples. For the sake of brevity, the disclosures of the publications, including patents, cited in this specification are herein incorporated by reference.

The examples below are non-limiting and are merely representative of various aspects and features of the present invention. The term "information source" used herein is defined as a sequence of symbols that can be interpreted as a message in the most limited technical meaning. And the message is used for organizing and labeling information. For example, the information source includes website (such as internet service), intranet, social network, software, electronic book, database and other media of information (such as storage media of non-transitory computer or storage media of mobile device). The term "original information" used herein is a file, a web page, a database row, a policy, a rule or any data accessible in corresponding machines and servers, but is not limited thereto. The term "original tool" used herein is a utility, a widget, an intelligent agent, an application, a service or any executable component accessible in corresponding machines and servers, but is not limited thereto. It is noted that the information sources, the original information and the original tool are not restricted to the above examples.

Moreover, "original information" and "original tool" are implementation examples of "original matters" used herein. In accordance with the present invention, a plurality of "original matters" from identical or different "information sources" are modeled to a plurality of "unified matters" by a unifying method. Consequently, the "unified matters" in the same execution environment are compatible with each other and cooperate to perform a specified task. The "unified tool" and the "unified information unit" are implementation examples of the "unified matters". Moreover, the term "Matterizer" used herein is a means, a device or a program code to perform the unifying process.

In an embodiment, the above unifying method comprises steps of: modeling at least one original information obtained from at least one information source of multiple information sources into a unified information unit with one unified data model via re-organizing the original information, and/or modeling at least one original tool obtained from at least one information source of multiple information sources into a unified tool with another unified data model via re-organizing the original tool. The one unified data model and another unified data model could be identical or different, and the unifying method described above could be completed through a matterizer.

Figure 1:
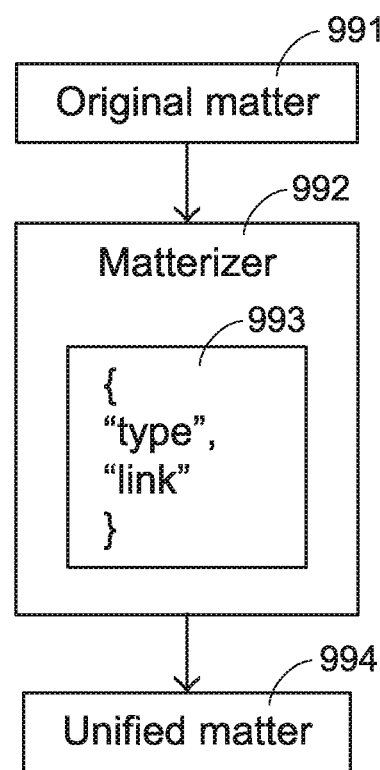
FIG. 1 is a schematic diagram illustrating an implementation concept of a unifying method according to an embodiment.

Please refer to FIG. 1. FIG. 1 is a schematic diagram illustrating an implementation concept of a unifying method according to an embodiment. As shown in FIG. 1, the matterizer 992 re-organizes an attribute and a link of an original matter 991 with a unified data model 993, and thus models the original matter 991 into a unified matter 994. Consequently, the basic attribute of the unified matter 994 include a type of the original matter 994 and a link indicating where the original matter 994 is located.

In this embodiment, the original matter 991 at least includes an original information (not shown) or an original tool (not shown), but is not limited thereto. In the above unifying method, if the attribute accessible from the original information corresponds to the attribute to be unified in the unified information unit, the unified information unit is directly produced through the matterizer 992. If the attribute accessible from the original information does not correspond to the attribute to be unified in the unified information unit, the original information is firstly re-defined by logically re-organizing the attributes and the link of the original information, and then the original information is converted into a new original information with the attributes which correspond to attributes to be unified in the unified information unit. Consequently, the unified information unit is indirectly produced.

Moreover, the type of the unified tool is used for defining a component type. The component type of the unified tool and the link where the unified tool is located are used to obtain a physical component essential to the unified tool for proceeding with plugging in, managing or executing. Moreover, if the original tool is compatible with the working environment of the workspace, the unified tool is directly produced by the matterizer 992. On the other hand, if the original tool is incompatible with the working environment of the workspace, the unified tool is indirectly produced via an adapter and/or a software development kit (SDK) of the original tool to drive the original tool. The adapter provides an interface implementation compatible with the working environment.

Herein, "the descriptions of the unifying method", "the methods of obtaining the unified matters" and "the descriptions of the matterizer" may be referred to the U.S. patent application Ser. No. 14/324,069, entitled "A method of unifying information and tool from a plurality of information sources", and also referred to the China Patent Application No. 201410768564.X, entitled "A method of unifying information and tool from a plurality of information sources and computer product and device using the method". The detailed descriptions thereof are omitted.

The above unifying method is presented herein for purpose of illustration and description only. The method of unifying a plurality of original matters from different information sources is not restricted. However, those skilled in the art will readily observe that numerous modifications and alterations may be made while retaining the teachings of the invention.

Hereinafter, two other unifying methods will be illustrated. The first unifying method is applied to a method of unifying the information of Garmin satellite navigation. Through a point-of-interest (POI) function of the Garmin satellite navigation, the method of unifying the information is employed to unify the imported original point information (i.e., an original information) into the corresponding unified point information (i.e., a unified information unit). The second unifying method is applied to a method of unifying the tool of an Android system. The Android system is a Linux-based open source mobile operating system. However, most application programs (i.e., original tools) are written in the Java programming language. Consequently, the application program (i.e., the original tool) written in the Java programming language can be modeled into a unified application program (i.e., the unified tool) compatible with the Android system so as to be executed in the Android system.

Figure 6:
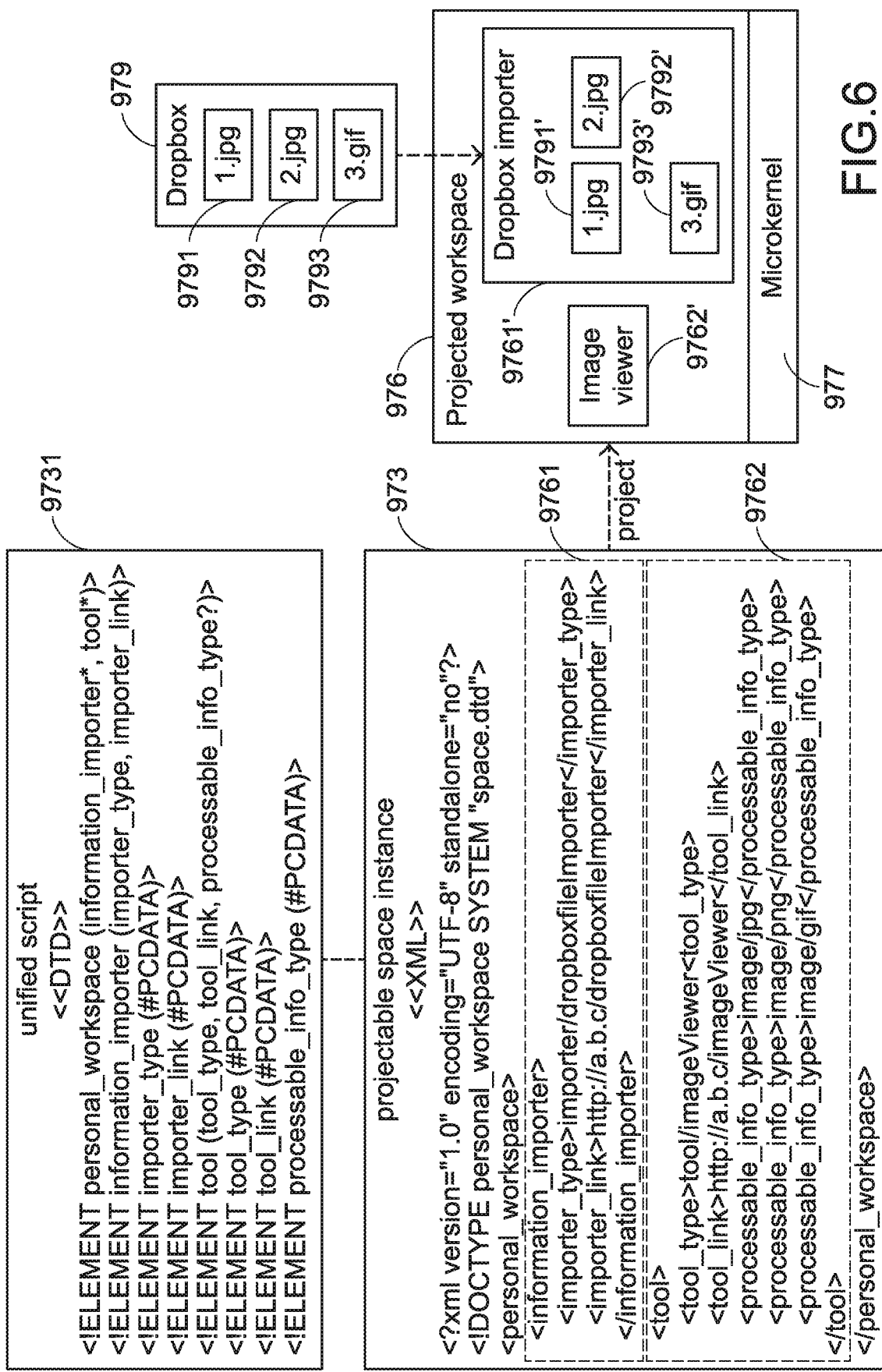
FIG. 6 is a schematic diagram illustrating the relationship between a projectable space instance as shown in FIG. 4 and a projected workspace as shown in FIG. 5B.

The term "workspace" used herein is a working environment for providing interactions between the at least one matterizer, the at least one tool and/or the at least one information so as to implement a specified task. Moreover, the at least one tool and/or at least one information can be imported into the workspace through the at least one matterizer. However, the way of importing the information and/or tool into the workspace is not restricted. Hereinafter, information importers such as the information importers 9881, 9882 and 9883 of FIG. 2 and the Dropbox importer 9761' of FIG. 6 are some examples of the matterizer. The term "unified script" used herein is an intermediate language to implement the workspace. Moreover, via the "unified script", the at least one matterizer, the at least one tool and/or the at least one information can be provided to the workspace (e.g., built in or plugged in the workspace).

In an embodiment, the above at least one information is a unified information unit which is produced after at least one original information obtained from at least one information source is unified, and the above at least one tool is a unified tool which is produced after at least one original tool obtained from at least one information source is unified. Moreover, according to different tasks, the required unified information unit and/or the required unified tool from the corresponding information source can be added to the personal workspace (e.g., built in or plugged in the personal workspace). In other words, the "workspace" is a user-orientated "personal workspace".

Figure 2:
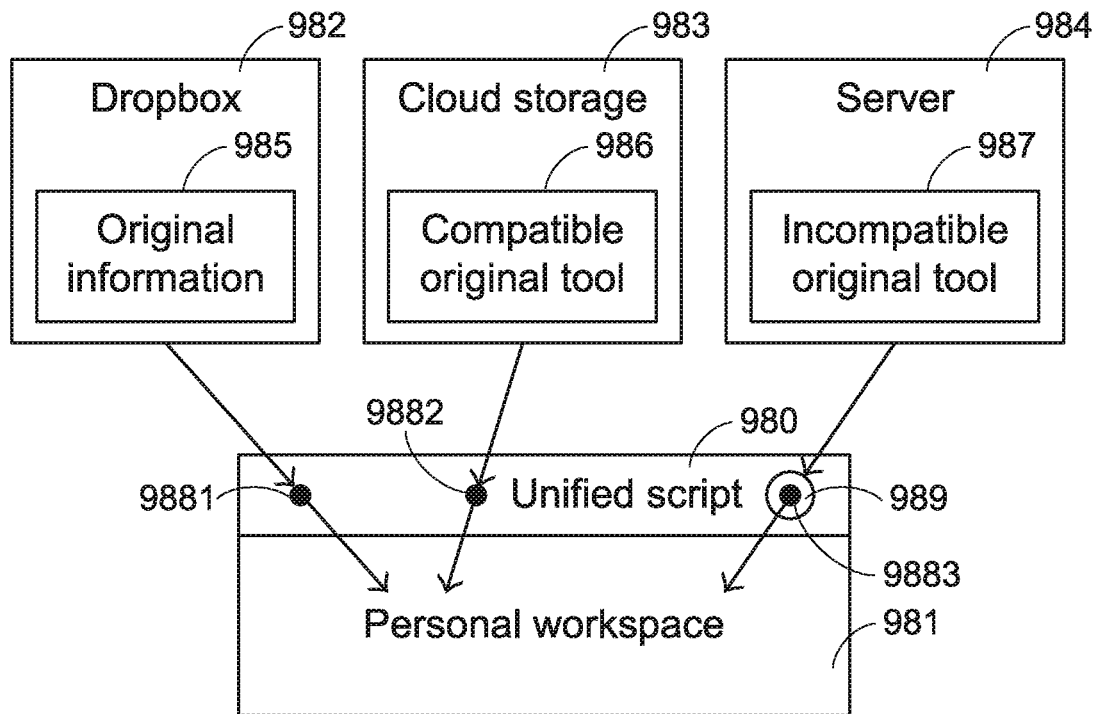
FIG. 2 is a schematic diagram illustrating an implementation concept of using the unified script as an intermediate language for implementing the personal workspace.
Figure 3:
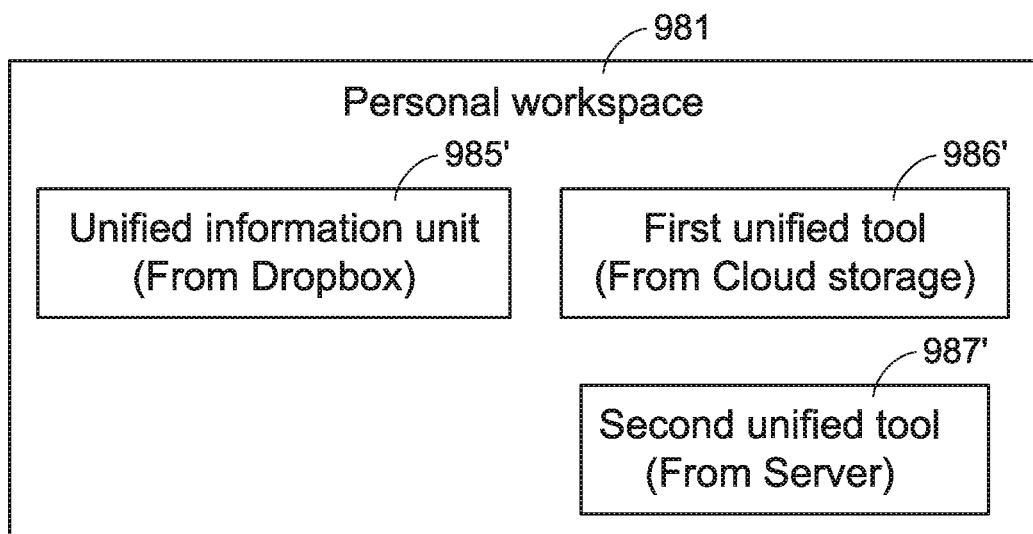
FIG. 3 is a schematic diagram illustrating a preferred configuration of a personal workspace.

Please refer to FIG. 2 and FIG. 3. FIG. 2 is a schematic diagram illustrating an implementation concept of using the unified script as an intermediate language for implementing the workspace. FIG. 3 is a schematic diagram illustrating a preferred configuration of a personal workspace. As shown in FIG. 2 and FIG. 3, a unified information unit 985' corresponding to an original information 985 in Dropbox 982, a first unified tool 986' corresponding to a compatible original tool 986 in a cloud storage 983 and a second unified tool 987' corresponding to an incompatible original tool 987 in a server 984 are combined together into a personal workspace 981 according to the required tasks. In particular, a unified script 980 which is regarded as an intermediate language for implementing the personal workspace 981 is firstly compiled, and then an information importer 9881 of the Dropbox 982, an information importer 9882 of the cloud storage 983 and an information importer 9883 of the server 984 are configured through the unified script 980. Moreover, after the original information 985 in the Dropbox 982 is unified into the unified information unit 985' by the information importer 9881, the unified information unit 985' is imported into the personal workspace 981.

As shown in FIG. 2 and FIG. 3, the original tool stored in the cloud storage 983 is the compatible original tool 986, which is compatible with the component architecture of the unified tool in the personal workspace 981. Moreover, the first unified tool 986' corresponding to the compatible original tool 986 is directly provided to the personal workspace 981 through the information importer 9882 of the unified script 980.

As shown in FIG. 2 and FIG. 3, the original tool stored in the server 984 is the incompatible original tool 987, which is incompatible with the component architecture of the unified tool in the personal workspace 981. Moreover, the second unified tool 987' corresponding to the incompatible original tool 987 is provided to the personal workspace 981 through the compatible adapter 989 and the information importer 9883 of the unified script 980.

As shown in FIG. 3, the user can configure and arrange (e.g., group or place) the unified information unit 985', the first unified tool 986' and the second unified tool 987' in a specific area of the personal workspace 981 according to the practical requirements. Moreover, according to the operational relationship between the unified tool and the unified information unit (e.g., the clicking or dragging actions between the two), the user can perform specified tasks by using the unified tool to access or control the corresponding unified information unit.

Herein, "the descriptions of using the unified script as the intermediate language for implementing the personal workspace" and "the descriptions of allowing the required unified information unit and/or the required unified tool from the corresponding information sources to be arbitrarily combined together into the personal workspace according to the practical requirements" may be referred to the U.S. patent application Ser. No. 14/325,466, entitled "Method for performing task on unified information units in a personal workspace", and also referred to the China Patent Application No. 201410768564.X, entitled "A method of combining unified matters in a personal workspace and computer product and device using the method". The detailed descriptions thereof are omitted.

The above personal workspace is presented herein for purpose of illustration and description only. It is noted that the workspace used in the present invention is not restricted. For example, the unified script as the intermediate language for implementing the workspace can be previously edited. Consequently, the workspace has the default matterizer, the default information and/or the default tool. This workspace is not limited to be operated by a single user. According to the practical requirements, this workspace can be operated by multiple users at the same time or at different times.

Moreover, the "workspace" used herein is obtained by "a method of projecting a workspace" to any electronic device with computational capability. An example of the electronic device includes but is not limited to a mobile phone, a tablet computer, a notebook computer or a desktop computer. Consequently, the "projected workspace" can be operated by any user through any electronic device with computational capability.

In an embodiment, the method of projecting the workspace comprises the following steps. Firstly, a projectable space instance instantiated by the unified script is obtained through a uniform resource identifier (URI). As mentioned above, the unified script is defined to configure at least one of the matterizer, the information and the tool to model the workspace. Moreover, the projectable space instance is used to build the projected workspace corresponding to the workspace, and thus provide an interface for operating at least one of the matterizer, the information and the tool to implement a task. Then, a projector parses the projectable space instance and build a working environment to configure at least one of the matterizer, the information and the tool so as to execute the projected workspace for providing interactions between at least one user and the projected workspace.

The projector is acquired from a remote data station, the projectable space instance or a preloaded application program, and loaded into an engine for providing a compatible environment to execute the projector. An example of the engine includes but is not limited to a Javascript engine, a Windows application or a Linux application. Preferably but not exclusively, the united script can be declared by a document type definition (DTD), an extensible markup language (XML) Schema, a structured language or a structured protocol. Preferably but not exclusively, the projectable space instance is an object, an extensible markup language (XML) document, or an instance instantiated with a structured language or a structured protocol.

Figure 4:
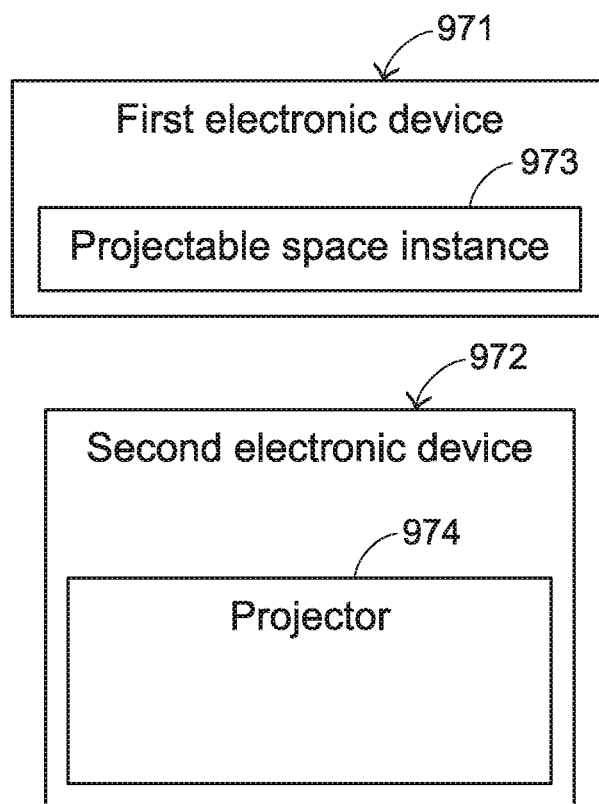
FIG. 4 is a schematic diagram illustrating an initial state of the method of projecting the workspace according to an embodiment of the present invention.
Figure 5A:
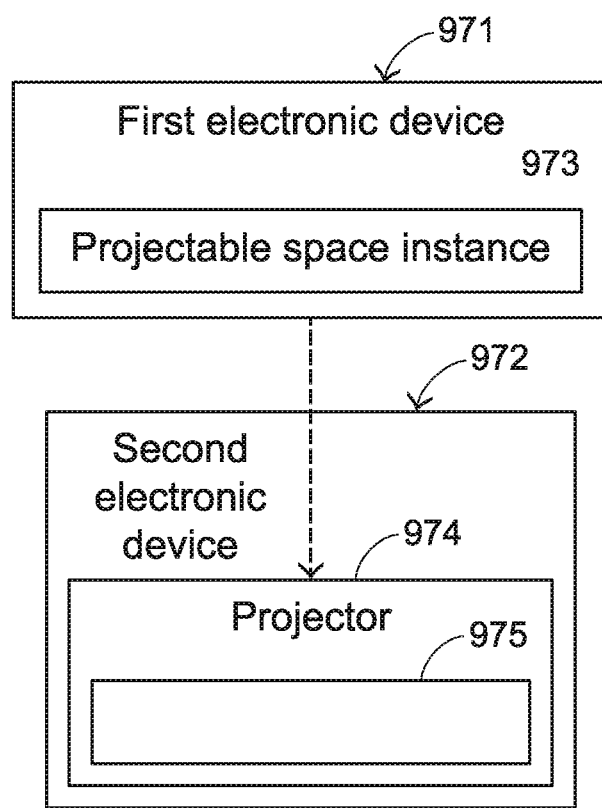
FIGS. 5A and 5B are schematic diagrams illustrating operating concepts of the method of projecting the workspace as shown in FIG. 4.
Figure 5B:
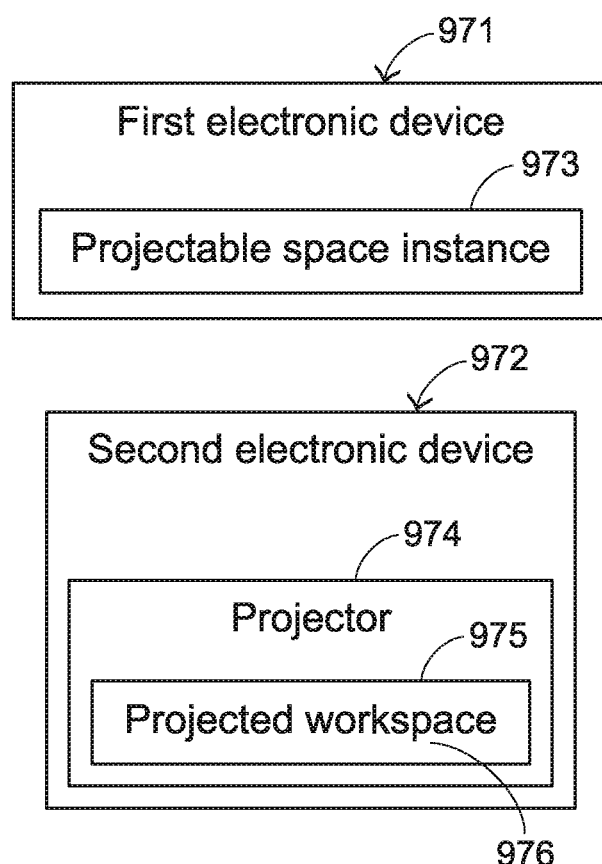

Please refer to FIG. 4, FIG. 5A, FIG. 5B and FIG. 6. FIG. 4 is a schematic diagram illustrating an initial state of the method of projecting the workspace according to an embodiment of the present invention. FIGS. 5A and 5B are schematic diagrams illustrating operating concepts of the method of projecting the workspace as shown in FIG. 4. FIG. 6 is a schematic diagram illustrating the relationship between a projectable space instance as shown in FIG. 4 and a projected workspace as shown in FIG. 5B.

In the initial state of FIG. 4, a first electronic device 971 and a second electronic device 972 are in communication with each other (e.g., through network connection). Moreover, the first electronic device 971 stores a projectable space instance 973, and the second electronic device 972 has a built-in projector 974.

In this embodiment, the united script 9731 is declared by a document type definition (DTD) and defined to configure at least one information importer (i.e., an example of the matterizer), at least one unified information unit and/or at least one unified tool to model a workspace, and the projectable space instance 973 is an instance instantiated with the extensible markup language (XML). As shown in FIG. 6, the projectable space instance 973 is used for building a projected workspace 976 corresponding to the workspace. Moreover, the information importer, the unified information and/or the unified tool is allowed to be added to or removed from the projectable space instance 973.

The projector 974 of the second electronic device 972 will build a working environment 975 in the second electronic device 972 for executing the projected workspace 976. In addition, the projector 974 provides a microkernel 977 (see FIG. 6) to the working environment 975 for equipping at least one information importer, at least one unified information and/or at least one unified tool that will be added to the projected workspace 976. When the second electronic device 972 acquires the projectable space instance 973 from the first electronic device 971 through a URI, the projector 974 of the second electronic device 972 starts to parse the projectable space instance 973 (see FIG. 5A). After the projectable space instance 973 is parsed by the projector 974, the projected workspace 976 is built in the working environment 975 according to parsed contents of the projectable space instance 973 (see FIG. 5B). Accordingly, a user of the second electronic device 972 can interact with the projected workspace 976 through the second electronic device 972 so as to perform related tasks.

The relationships between the unified script 9731, the projectable space instance 973 and the projected workspace 976 will be illustrated in more detailed through a usage situation as shown in FIG. 6. The usage situation as shown in FIG. 6 is related to a process of building a projected workspace that is capable of accessing jpg format image files and gif format image files from a specified internet space and allowing the image files to be viewed by a user. In this usage situation, the unified script 9731 is declared by the Document Type Definition (DTD), and the projectable space instance 973 is instantiated with XML.

Moreover, an information importer and a unified tool are added into the projectable space instance 973, and at least one unified information unit corresponding to the original information is imported into the projected workspace 976 through the information importer. In this usage situation, the information importer is a Dropbox importer. The information of the Dropbox importer is disclosed in the dashed line frame 9761 of FIG. 6. The original information includes a jpg format image file 9791, a jpg format image file 9792 and a gif format image file 9793 in Dropbox 979 (i.e., an information source). The unified information units includes a unified jpg format image file 9791', a unified jpg format image file 9792' and a unified gif format image file 9793', which will be described later. The unified tool is an image viewer for accessing image files which are imported into the projected workspace 976. The information of the image viewer is disclosed in the dashed line frame 9762 of FIG. 6.

As mentioned above, the projected workspace 976 is built after the projectable space instance 973 is parsed by the projector 974 of the second electronic device 972. In this embodiment, the Dropbox importer 9761' corresponding to the dashed line frame 9761 and the image viewer 9762' corresponding to the dashed line frame 9762 are configured in the projected workspace 976. Moreover, the jpg format image file 9791, the jpg format image file 9792 and the gif format image file 9793 in Dropbox 979 are unified and imported into the projected workspace 976 by the Dropbox importer 9761'. Consequently, the unified jpg format image file 9791' corresponding to the jpg format image file 9791, the unified jpg format image file 9792' corresponding to the jpg format image file 9792 and the unified gif format image file 9793' corresponding to the gif format image file 9793 are displayed on the projected workspace 976. When the user of the second electronic device 972 manipulates any of the unified image files 9791', 9792' and 9793' by any specified operating means (such as an action of clicking any of the unified images files 9791', 9792' and 9793' or an action of dragging and dropping any of the image files 9791', 9792' and 9793' to the image viewer 9762'), the image viewer 9762' will access the contents of the corresponding unified image files 9791', 9792' or 9793' to allow the unified image files 9791', 9792' or 9793' to be viewed by the user. Moreover, the Dropbox importer 9761' and the image viewer 9762' mentioned above are equipped by the microkernel 977.

It is noted that the URI of the projectable space instance 973 may be a HTTP (hypertext transfer protocol) URI or a FTP (file transfer protocol) URI. In case that the first electronic device 971 and the second electronic device 972 are integrated into one device, the URI of the projectable space instance 973 can also be a local file URI. However, the types of the URI of the projectable space instance 973 are not restricted.

Herein, "the descriptions of the method of projecting the workspace" may be referred to the U.S. patent application Ser. No. 14/577,772, entitled "Method of projecting a workspace and system using the same", and also referred to the China Patent Application No. 201410814138.5, entitled "Method of projecting a workspace and system using the same". The detailed descriptions thereof are omitted.

The above method of projecting the workspace to any electronic device with computational capability is presented herein for purpose of illustration and description only. The method of projecting the workspace to any electronic device with computational capability is not restricted. However, those skilled in the art will readily observe that numerous modifications and alterations may be made while retaining the teachings of the invention. Moreover, any workspace can be projected to any electronic device with computational capability. That is, any workspace can be delivered to any electronic device with computational capability. Consequently, the workspace is also a working platform for allowing multiple cooperators to implement the cooperative task.

Figure 7:
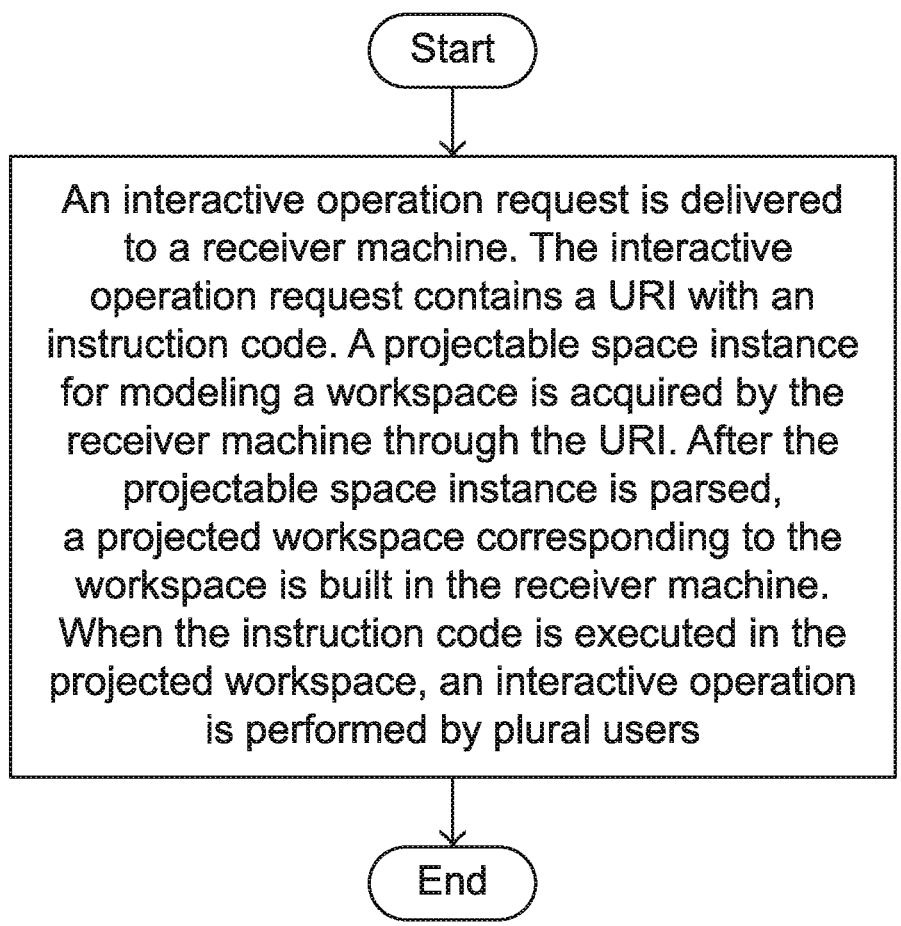
FIG. 7 is a flowchart illustrating an interactive operation method for a transmitter machine according to an embodiment of the present invention.
Figure 8:
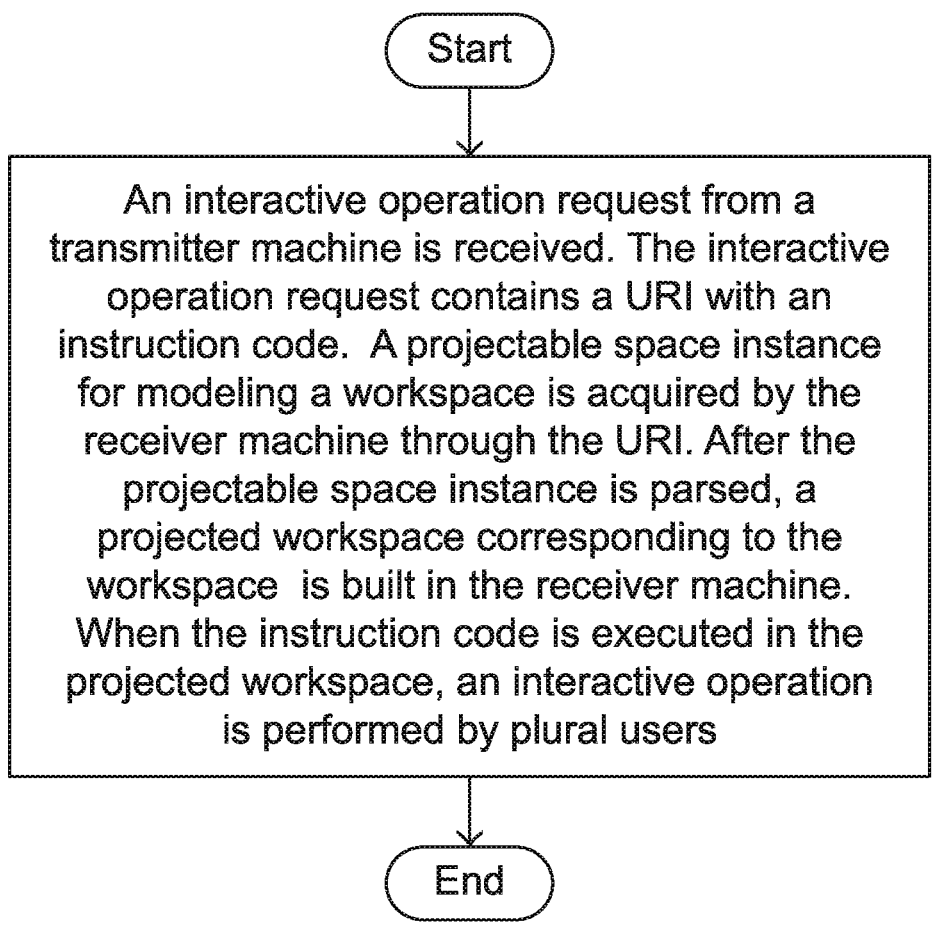
FIG. 8 is a flowchart illustrating an interactive operation method for a receiver machine according to an embodiment of the present invention.
Figure 9:
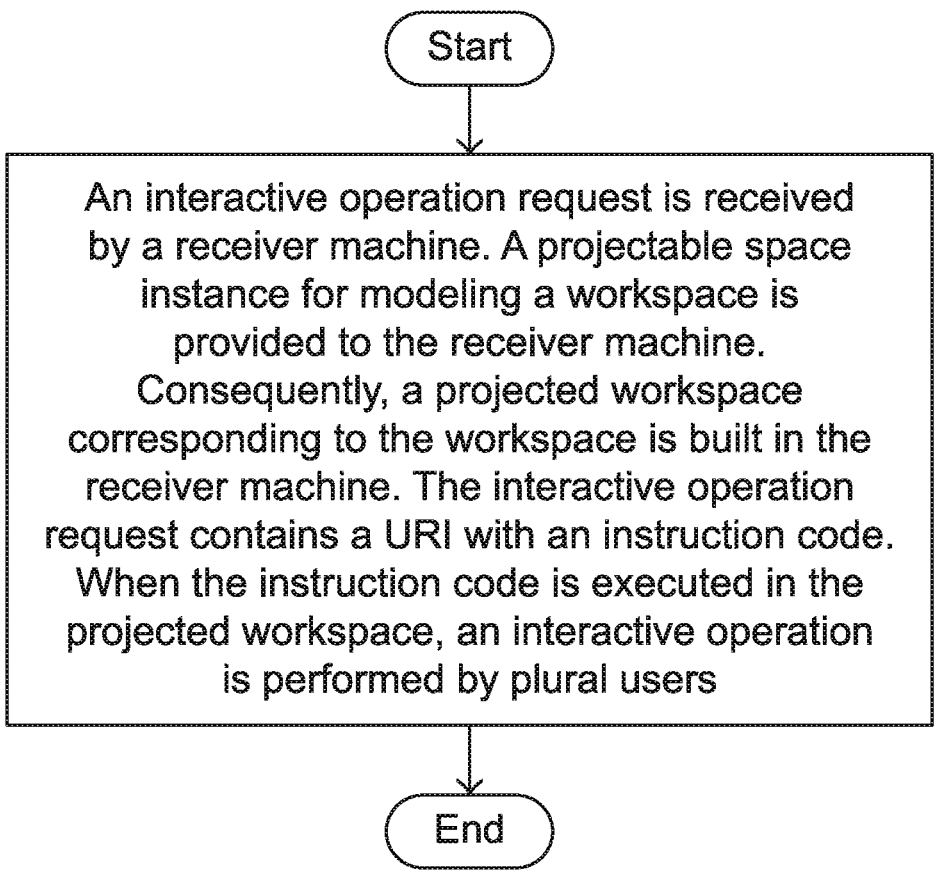
FIG. 9 is a flowchart illustrating an interactive operation method for an interactive operation system according to an embodiment of the present invention.

Hereinafter, an interactive operation method of the present invention will be illustrated with reference to FIGS. 7, 8 and 9. FIG. 7 is a flowchart illustrating an interactive operation method for a transmitter machine according to an embodiment of the present invention. FIG. 8 is a flowchart illustrating an interactive operation method for a receiver machine according to an embodiment of the present invention. FIG. 9 is a flowchart illustrating an interactive operation method for an interactive operation system according to an embodiment of the present invention.

Please refer to FIG. 7. The interactive operation method for the transmitter machine includes the following steps. Firstly, an interactive operation request is delivered from a transmitter machine of a first user to a receiver machine of a second user. The interactive operation request contains a uniform resource identifier (URI) with an instruction code. A projectable space instance for modeling a workspace is acquired by the receiver machine through the URI. After the projectable space instance is parsed, a projected workspace corresponding to the workspace is built in the receiver machine. When the instruction code is executed in the projected workspace, a task corresponding to an interactive operation is performed.

Please refer to FIG. 8. The interactive operation method for the receiver machine includes the following steps. Firstly, an interactive operation request from a transmitter machine is received by the receiver machine. The interactive operation request contains a uniform resource identifier (URI) with an instruction code. A projectable space instance for modeling a workspace is acquired by the receiver machine through the URI. After the projectable space instance is parsed, a projected workspace corresponding to the workspace is built in the receiver machine. When the instruction code is executed in the projected workspace, an interactive operation is performed by a second user of the receiver machine and a first user of the transmitter user.

Please refer to FIG. 9. The interactive operation method for the interactive operation system includes the following steps. Firstly, an interactive operation request is received by the receiver machine. Then, a projectable space instance for modeling a workspace is provided to the receiver machine.

Consequently, a projected workspace corresponding to the workspace is built in the receiver machine. The interactive operation request contains a uniform resource identifier (URI) with an instruction code. When the instruction code is executed in the projected workspace, an interactive operation is performed by plural users. Hereinafter, the interactive operation method as shown in FIGS. 7-9 will be illustrated in more details with reference to FIGS. 10-13.

Figure 10:
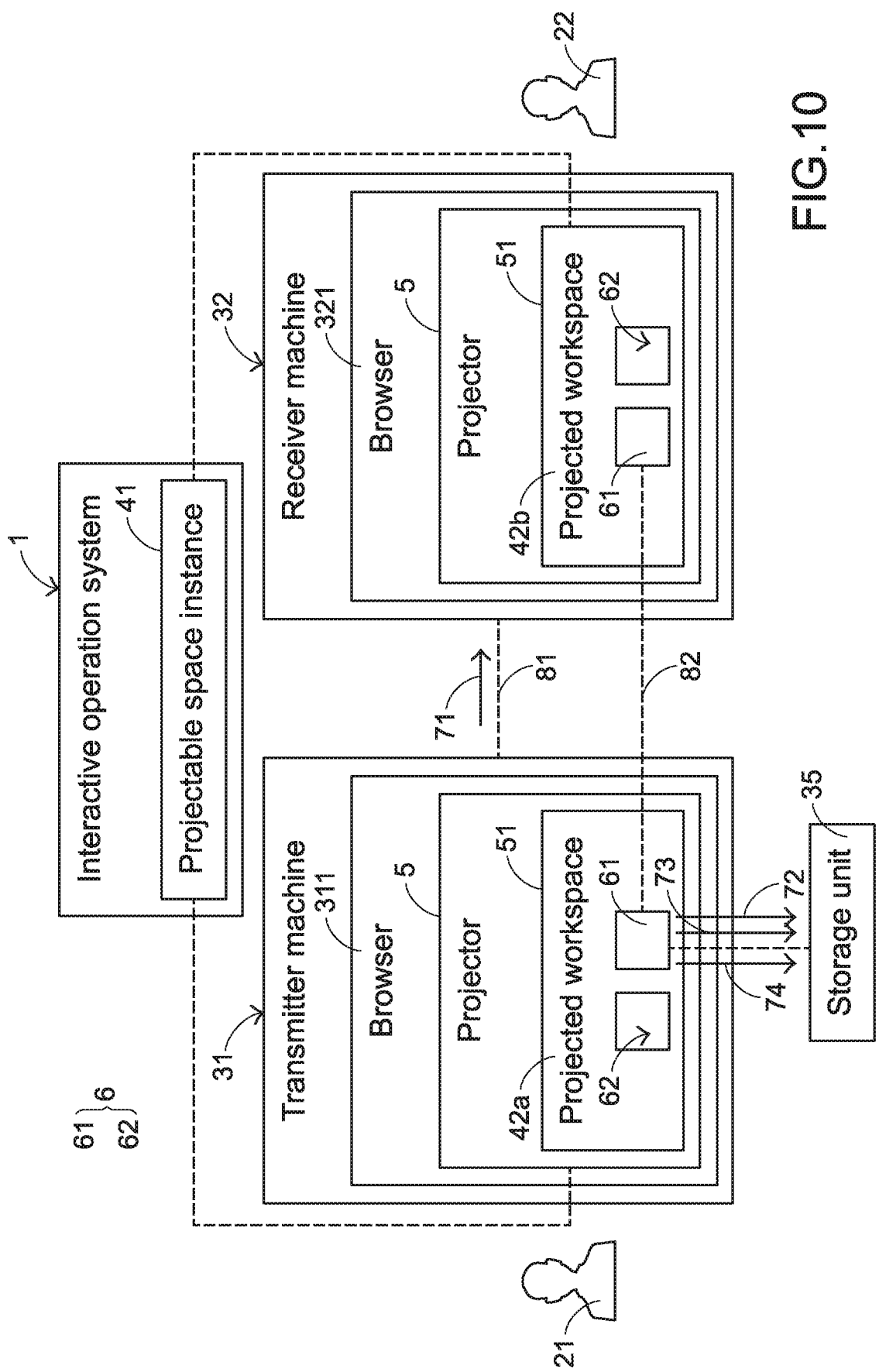
FIG. 10 is a schematic diagram illustrating the operating concept of an interactive operation system, a transmitter machine and a receiver machine using the interactive operation method of FIGS. 7-9.
Figure 11:
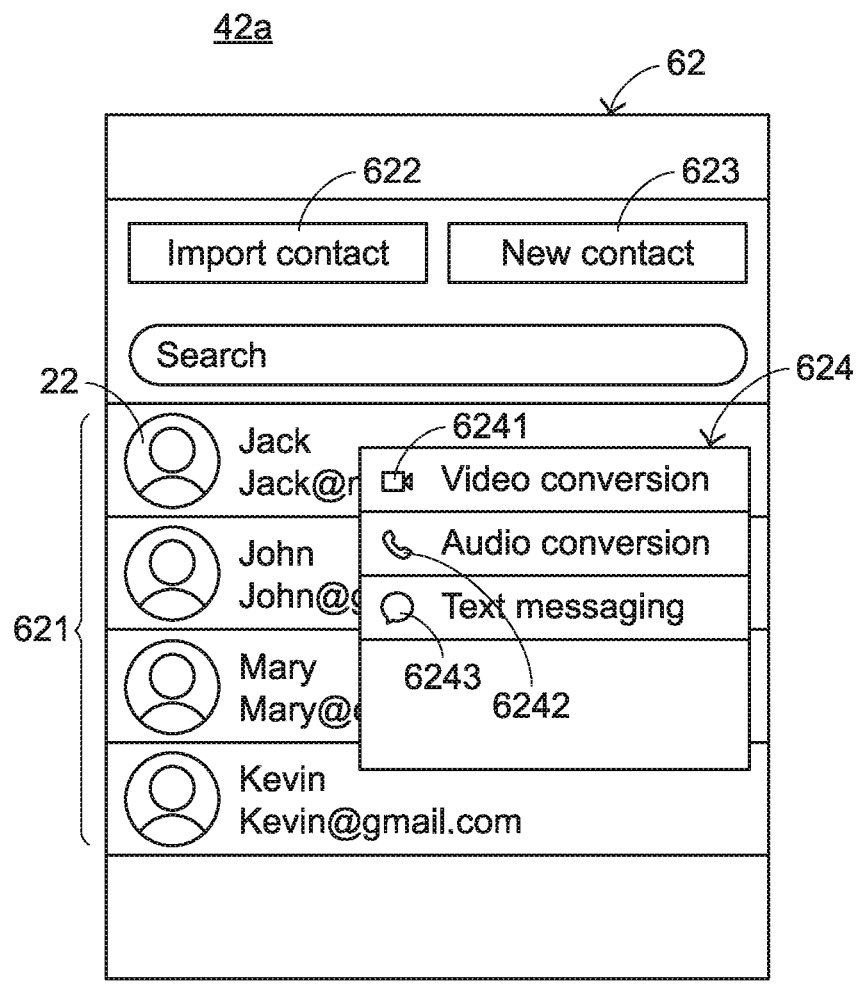
FIG. 11 is a schematic diagram illustrating a projected workspace shown on the transmitter machine of FIG. 10.
Figure 12:
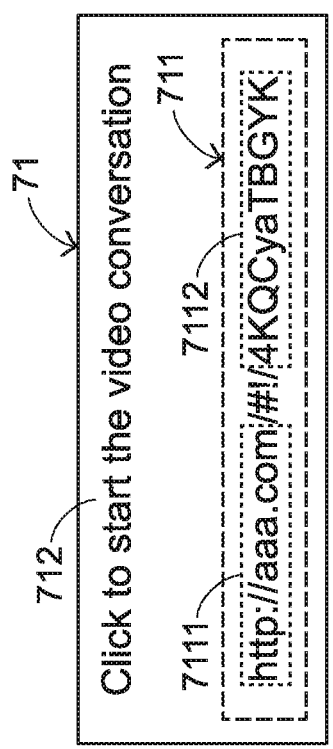
FIG. 12 is a schematic diagram illustrating the contents of an interactive operation request of FIG. 10.
Figure 13:
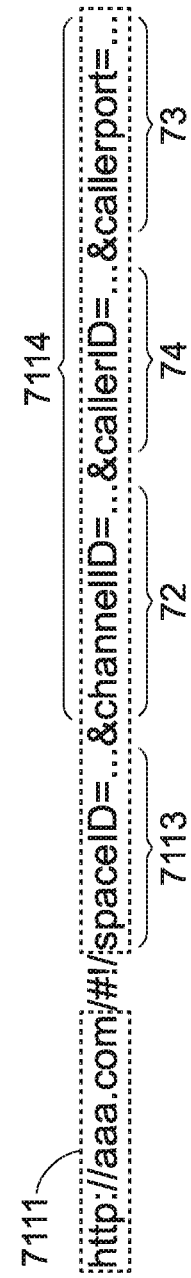
FIG. 13 is a schematic diagram illustrating a URI of the interactive operation request before encoded.

Please refer to FIGS. 10-13. FIG. 10 is a schematic diagram illustrating the operating concept of an interactive operation system, a transmitter machine and a receiver machine using the interactive operation method of FIGS. 7-9. FIG. 11 is a schematic diagram illustrating a projected workspace shown on the transmitter machine of FIG. 10. FIG. 12 is a schematic diagram illustrating the contents of an interactive operation request of FIG. 10. FIG. 13 is a schematic diagram illustrating a URI of the interactive operation request before encoded.

Firstly, a projectable space instance 41 for modeling a workspace is stored in the interactive operation system 1. Then, a first user 21 launches a browser 311 of a transmitter machine 31, and the projectable space instance 41 of the interactive operation system 1 is loaded into the transmitter machine 31. Consequently, a projector 5 in the transmitter machine 31 will build a working environment 51 in the transmitter machine 31 for executing a projected workspace 42a. In addition, a microkernel (not shown) corresponding to the projected workspace 42a is provided from the projector 5 to the working environment 51 for equipping at least one unified matter of the projectable space instance 41. After the projectable space instance 41 is loaded into the transmitter machine 31, the projector 5 starts to parse the projectable space instance 41. After the projectable space instance 41 is parsed by the projector 5, the projected workspace 42a is built in the working environment 51 of the transmitter machine 31 according to parsed contents of the projectable space instance 41. Moreover, according to the practical requirements, the first user 21 can arbitrarily add other unified matters into the projected workspace 42a or remove the equipped unified matters from the projected workspace 42a.

In this embodiment, the unified matters equipped in the projected workspace 42a include unified tools 6 for performing the task corresponding to the interactive operation. The unified tools 6 include a communication tool 61 and a contact tool 62. As shown in FIG. 11, a contact list 621 managed by the first user 21 is shown in the contact tool 62. The contact persons in the contact list 621 contain the accounts from social networking websites (e.g., Facebook or Twitter) or the accounts from the instant messaging applications (e.g., LINE, WhatsAPP or WeChat). These accounts are added to the contact list 621 through an import contact option 622. Moreover, the contact list 621 contains a new contact person that is added to the contact list 621 through a new contact option 623 by keying in the information of new contact person (e.g., an email address). The way of adding the contact persons to the contact list 621 is presented herein for purpose of illustration and description only.

When the first user 21 wants to perform the interactive operation with a contact person of the contact list 621 (e.g., the second user 22), the first user 21 may click the second user 22 contained in the contact list 621. Consequently, a pop-up menu 624 is shown on the projected workspace 42a by the contact tool 62. In this embodiment, the pop-up menu 624 contains a video conversation option 6241, an audio conversation option 6242 and a text messaging option 6243. The first user 21 may select one of the options 6241, 6242 and 6243 for determining a way of performing the interactive operation with the second user 22. For example, the way of performing the interactive operation is the video conversation. That is, the first user 21 selects the video conversation option 6241. While the video conversation option 6241 is accessed, an interactive operation request 71 is delivered to a receiver machine 32 of the second user 22 through a pipeline 81 (see FIG. 12). For example, the pipeline 81 is a social networking website (e.g., Facebook or Twitter), an instant messaging application program (e.g., LINE, WhatsAPP or WeChat) or an email address. The above examples are presented herein for purpose of illustration and description only. It is noted that the way of selecting the contact person by the first user 21, the profiles of the projected workspace 42a and the communication tool 61 shown on the transmitter machine 31, the way of selecting the interactive operation by the first user 21 and the type of the pipeline 81 are not restricted.

After the first user 21 selects the contact person (i.e., the second user 22) and the video conversation option 6241, a channel ID 72 corresponding to the video conversation is delivered from the communication tool 61 to a storage unit 35. The channel ID 72, a caller port 73 and a caller ID 74 are stored in the storage unit 35 and integrated into the projectable space instance 41. Preferably but not exclusively, the storage unit 35 is included in the interactive operation system 1, the transmitter machine 31 or a remote machine that is in communication with the transmitter machine 31.

In this embodiment, the interactive operation request 71 contains a uniform resource identifier (URI) 711. For example, the URI 711 is a HTTP (hypertext transfer protocol) URI, a FTP (file transfer protocol) URI or local file URI. Preferably but not exclusively, the interactive operation request 71 further contains a status description 712, e.g., a description "Click to start the video conversation". The URI 711 of the interactive operation request 71 is generated by the communication tool 61. Moreover, the URI 711 contains at least two parts. The first part is a domain name 7111 corresponding to a web address of the interactive operation system 1. The second part is an encoded character string 7112. The encoded character string 7112 contains a space ID 7113 corresponding to the projectable space instance 41 and an instruction code 7114 corresponding to an information of the first user 21 and/or the transmitter machine 31. The information of the instruction code 7114 contains the channel ID 72, the caller port 73 and the caller ID 74. For example, the encoded character string of the URI 711 is "4KQCyaTBGYK", and the URI 711 is "spaceID= . . . &channelID= . . . &callerID= . . . &callerport= . . . " before encoded. It is noted that the URI 711 is not restricted to be generated by the communication tool 61, and the information of the instruction code 7114 is not restricted.

After the interactive operation request 71 from the transmitter machine 31 is received by the receiver machine 32 of the second user 22 and the second user 22 opens the URI 711 of the interactive operation request 71 through a browser 321 of the receiver machine 32, the projectable space instance 41 is loaded into the receiver machine 32 according to the domain name 7111 and the space ID 7113 of the URI 711. Consequently, a projector 5 in the receiver machine 32 will build a working environment 51 in the receiver machine 32 for executing the projected workspace 42b. In addition, a microkernel (not shown) corresponding to the projected workspace 42b is provided from the projector 5 to the working environment 51 for equipping the unified matter of the projectable space instance 41. After the projectable space instance 41 is loaded into the receiver machine 32, the projector 5 starts to parse the projectable space instance 41. After the projectable space instance 41 is parsed by the projector 5, the projected workspace 42b is built in the working environment 51 of the receiver machine 32 according to parsed contents of the projectable space instance 41.

According to the instruction code 7114 in the URI 711 of the interactive operation request 71, an interactive operation (i.e., the video conversion) is performed by the first user 21 and the second user 22 through the projected workspaces 42a and 42b. In particular, after the encoded character string 7112 of the URI 711 is decoded by the projected workspace 42b, the instruction code 7114 containing the channel ID 72, the caller port 73, the caller ID 74 and the information of the first user 21 and/or the transmitter machine 31 will be acquired. Consequently, after the interactive operation request 71 is received by the receiver machine 32, an answering signal in response to the operation of the second user 22 is sent to the caller ID 74 via the caller port 73. Under this circumstance, a communication line 82 is established between the first user 21 and the second user 22. Consequently, the first use 21 and the second use 22 can perform the video conversation immediately through the communication tool 61. Preferably but not exclusively, the communication tool 61 is a WebRTC-supported unified tool.

It is noted that the caller port 73 and the caller ID 74 are related to the channel ID 72. Consequently, in another embodiment, the instruction code 7114 only contains the channel ID 72, and the projected workspace 42b acquires the caller port 73 and the caller ID 74 via the channel ID 72 directly. In another embodiment, the channel ID 72 is omitted. Similarly, after the interactive operation request 71 is received by the receiver machine 32, an answering signal in response to the operation of the second user 22 is still sent to the caller ID 74 via the caller port 73.

In the above embodiment, the interactive operation performed by the first user 21 and the second user 22 is the video conversion. In some other embodiments, the interactive operation includes the audio conversation, the text messaging operation or the file sharing operation. The implementations of these interactive operations are similar to the video conversion. Regardless of the type of the interactive operation, the task corresponding to the interactive operation is performed according to the instruction code. However, those skilled in the art will readily observe that numerous modifications and alterations may be made while retaining the teachings of the invention. In the above embodiment, the projectable space instance 41 for modeling the workspace is stored in the interactive operation system 1. In some other embodiments, the projectable space instance 41 is stored in the transmitter machine 31. Meanwhile, the first part of the URI 711 of the interactive operation request 71 is changed to a domain name corresponding to a web address of the transmitter machine 31.

In the above embodiment, the second part of the URI 711 of the interactive operation request 71 contains the space ID 7113 and the instruction code 7114. In another embodiment as shown in FIG. 13, the second part of the URI 711 of the interactive operation request 71 is directly delivered to the receiver machine 32 without being encoded. Consequently, the instruction code 7114 containing the channel ID 72, the caller port 73, the caller ID 74 and the information of the first user 21 and/or the transmitter machine 31 can be acquired by the projected space 42b without the need of performing the decoding action. Under this circumstance, the communication line 82 is established between the first user 21 and the second user 22.

From the above descriptions, the first user 21 and the second user 22 can perform the interactive operation through the transmitter machine 31 and the receiver machine 32 without downloading any application program or registering any account. More especially, while the interactive operation is performed, the first user 21 and the second user 22 can perform other interactive or cooperative tasks. As mentioned above, the projected workspaces 42a and 42b have been respectively built in the transmitter machine 31 of the first user 21 and the receiver machine 32 of the second user 22. Consequently, if the interactive operation is being performed, the first user 21 and the second user 22 can freely add other unified matters to the projected workspaces 42a and 42b according to the practical requirements. For example, an electronic whiteboard tool, a presentation editing tool or any other unified matter can be added to the projected workspaces 42a and 42b in order to perform cooperative task.

Herein, "the descriptions of performing the cooperative task through the workspace" may be referred to the China Patent Application No. 201510003717.6, entitled "Networking cooperation method and machine using such method", and also referred to the PCT Patent No. PCT/CN2015/083179, which claims the benefit of priority to the China Patent Application No. 201510003717.6 and is entitled "Networking cooperation method and machine using such method". The detailed descriptions thereof are omitted.

Figure 14:
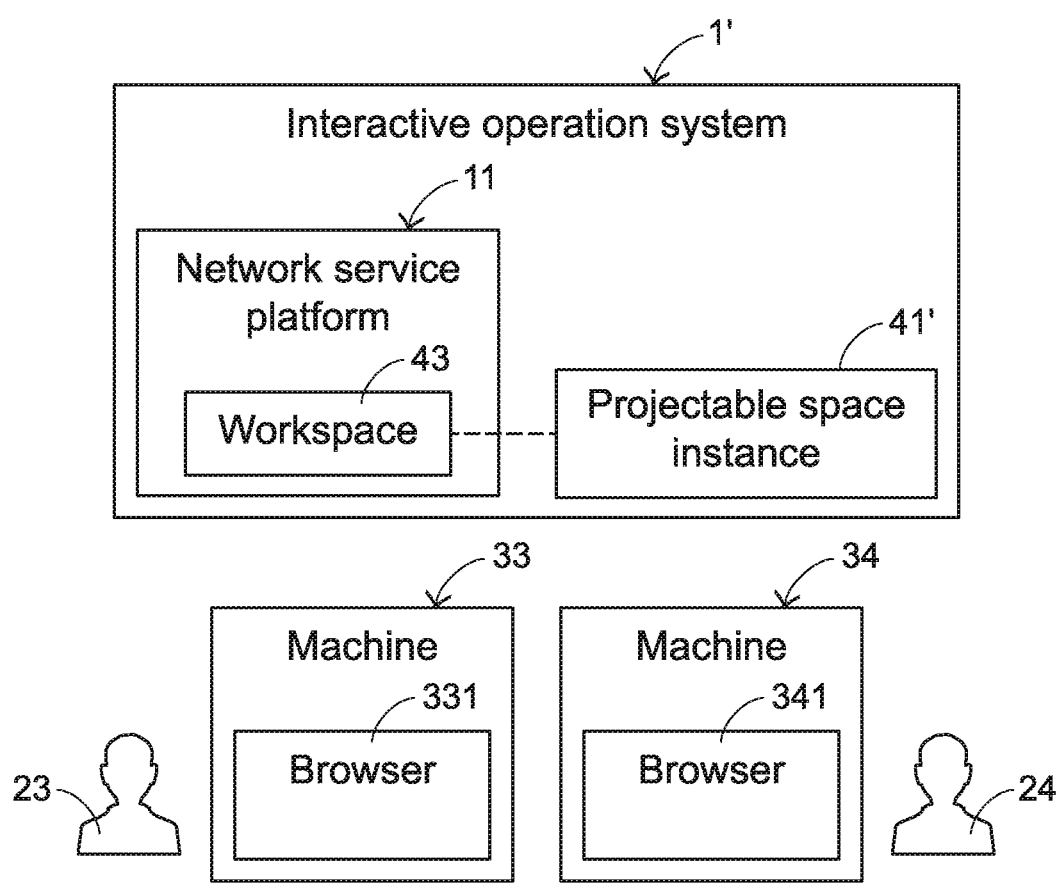
FIG. 14 is a schematic diagram illustrating the use of the interactive operation system of the present invention as a device for hosting the network service platform.

Moreover, the interactive operation system is a personal device to be used by a personal user, or the interactive operation system is a network service device for hosting a network service platform. For example, the network service device is a commercial device, a community-owned device or a non-profit device. FIG. 14 is a schematic diagram illustrating the use of the interactive operation system of the present invention as a device for hosting the network service platform. As shown in FIG. 14, the users 23 and 24 can access the network service platform 11 that is hosted by the interactive operation system 1' through the browsers 331 and 341, respectively. Moreover, after the users 23 and 24 register or apply accounts to login into the network service platform 11 through the machines 33 and 34, the users 23 and 24 can build their own workspaces 43. Consequently, the users 23 and 24 can perform interactive operations with other users through their workspaces 43. A projectable space instance 41a' for modeling the workspace 43 is included in the interactive operation system 1'. In addition, the data of the accounts that are registered or applied by the users 23 and 24 are recorded into the interactive operation system 1'. The methods of allowing the users perform the interactive operations with other users are similar to those mentioned above, and are not redundantly described herein.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An interactive operation method, comprising steps of:
providing an interactive operation request, wherein the interactive operation request contains a uniform resource identifier with an instruction code, the uniform resource identifier is used for acquiring a projectable space instance for modeling a workspace, and at least one unified matter is allowed to be added to or removed from the projectable space instance, the at least one unified matter includes one unified tool; and allowing plural users to perform an interactive operation through a projected workspace corresponding to the workspace according to the instruction code, wherein the projected workspace is built according to parsed contents of the projectable space instance after the projectable space instance is parsed by a projector, and the projectable space instance is an object, an extensible markup language document, or an instance which is instantiated with a structured language or a structured protocol;

wherein the interactive operation is performed by a unified tool in the projected workspace, wherein the unified tool is produced by modeling, with one unified data model, an original tool from an external information source, and wherein the unified tool is modeled by re-organizing attributes and an associated link of the original tool requested from the external information source.

2. The interactive operation method according to claim 1, wherein the unified tool is modeled by re-organizing attributes and an associated link of the original tool comprising:

if the original tool is compatible with the working environment of the workspace, the unified tool is directly produced by an information importer to import the unified tool into the projected workspace;

if the original tool is incompatible with the working environment of the workspace, the unified tool is indirectly produced via an adapter and/or a software development kit (SDK) of the original tool to drive the original tool.

3. The interactive operation method according to claim 1, wherein the interactive operation request is delivered from a transmitter machine of a first user of the plural users and received by a receiver machine of at least one second user of the plural users, wherein the instruction code contains at least one information about the first user and/or the transmitter machine.

4. The interactive operation method according to claim 3, wherein the interactive operation includes an audio conversation or a video conversation, and the at least one information contains at least one of a channel ID, a caller port and a caller ID.

5. An interactive operation method, comprising steps of:
delivering or receiving an interactive operation request; and
allowing a first user and a second user to perform an interactive operation according to the interactive operation request,
wherein the interactive operation request contains a uniform resource identifier with an instruction code, and at least one unified matter is allowed to be added to or removed from the projectable space instance, the at least one unified matter includes one unified tool, the projectable space instance for modeling a workspace is acquired through the uniform resource identifier, and a projected workspace corresponding to the workspace is built according to parsed contents of the projectable space instance after the projectable space instance is parsed by a projector, and the projectable space instance is an object, an extensible markup language document, or an instance which is instantiated with a structured language or a structured protocol, wherein when the instruction code is executed in the projected workspace, a task corresponding to the interactive operation is performed;

wherein the interactive operation is performed by a unified tool in the projected workspace, wherein the unified tool is produced by modeling, with one unified data model, an original tool from an external information source, wherein the unified tool is modeled by re-organizing attributes and an associated link of the original tool requested from the external information source.

6. The interactive operation method according to claim 5, further comprising a step of building a workspace and configuring the workspace before the interactive operation request is performed; or when the instruction code is executed, at least one unified tool of the projected workspace performs the task.

7. The interactive operation method according to claim 5, wherein the interactive operation request is delivered from a transmitter machine of the first user and received by a receiver machine of the second user, wherein the instruction code contains at least one information about the first user and/or the transmitter machine.

8. The interactive operation method according to claim 7, wherein the interactive operation includes an audio conversation or a video conversation, and the at least one information contains at least one of a channel ID, a caller port and a caller ID.

9. An interactive operation method, comprising steps of:
allowing a projectable space instance for modeling a workspace to be provided to a receiver machine when an interactive operation request is received by the receiver machine;
building a projected workspace corresponding to a workspace according to parsed contents of the projectable space instance after the projectable space instance is parsed by a projector, and the projectable space instance is an object, an extensible markup language document, or an instance which is instantiated with a structured language or a structured protocol, wherein the interactive operation request contains a uniform resource identifier with an instruction code, the uniform resource identifier is used for acquiring the projectable space instance for modeling the workspace, and at least one unified matter is allowed to be added to or removed from the projectable space instance, the at least one unified matter includes one unified tool; and
allowing plural users to perform an interactive operation through the projected workspace according to the instruction code;
wherein the interactive operation is performed by a unified tool in the projected workspace,
wherein the unified tool is produced by modeling, with one unified data model, an original tool from an external information source,
wherein the unified tool is modeled by re-organizing attributes and an associated link of the original tool requested from the external information source.

10. The interactive operation method according to claim 9, wherein the interactive operation request is delivered from a transmitter machine of a first user of the plural users and received by the receiver machine of at least one second user of the plural users, wherein the instruction code contains at least one information about the first user and/or the transmitter machine.

11. The interactive operation method according to claim 10, wherein the interactive operation includes an audio conversation or a video conversation, and the at least one information contains at least one of a channel ID, a caller port and a caller ID.

12. The interactive operation method according to claim 9, wherein when the instruction code is executed, at least one unified tool of the projected workspace performs a task corresponding to the interactive operation.

13. An interactive operation system, comprising:
a projectable space instance for modeling a workspace; and
a receiver machine, wherein when an interactive operation request is received by the receiver machine, the projectable space instance is provided to a receiver machine, so that a projected workspace corresponding to the workspace is built according to parsed contents of the projectable space instance after the projectable space instance is parsed by a projector, and the projectable space instance is an object, an extensible markup language document, or an instance which is instantiated with a structured language or a structured protocol, wherein the interactive operation request contains a uniform resource identifier with an instruction code, the uniform resource identifier is used for acquiring the projectable space instance for modeling a workspace, and at least one unified matter is allowed to be added to or removed from the projectable space instance, the at least one unified matter includes one unified tool, and plural users perform an interactive operation through the projected workspace according to the instruction code;

wherein the interactive operation is performed by a unified tool in the projected workspace, wherein the unified tool is produced by modeling, with one unified data model, an original tool from an external information source, wherein the unified tool is modeled by re-organizing attributes and an associated link of the original tool requested from the external information source.

14. The interactive operation system according to claim 13, wherein the interactive operation request is delivered from a transmitter machine of a first user of the plural users and received by the receiver machine of at least one second user of the plural users, wherein the instruction code contains at least one information about the first user and/or the transmitter machine; or when the instruction code is executed, at least one unified tool of the projected workspace performs a task corresponding to the interactive operation.

* * * * *